(12) United States Patent
Kotoyori et al.

(10) Patent No.: US 6,228,203 B1
(45) Date of Patent: May 8, 2001

(54) DISK BONDING METHOD AND SYSTEM (75) Inventors: Masahiko Kotoyori, Tokyo; Koji Yamaguchi, Yokohama; Hironobu Nishimura, Saitama; Shinichi Shinohara; Hideo Kobayashi, both of Tokyo; Masahiro Nakamura, Saitama, all of (JP)

(73) Assignee: Origin Electric Company, Limited, Tokyo (JP)

( * ) Notice: Subject to any disclaimer, the term of this patent is extended or adjusted under 35 U.S.C. 154(b) by 0 days.

(21) Appl. No.: 09/304,539

(22) Filed: May 4, 1999

(30) Foreign Application Priority Data

May 11, 1998 (JP) .................................................. 10-145042
Aug. 27, 1998 (JP) .................................................. 10-257530

(51) Int. Cl.$^7$ .............................. B32B 7/14; B32B 31/00
(52) U.S. Cl. .......................... 156/291; 156/295; 156/556
(58) Field of Search .................................. 156/291, 295, 156/538, 539, 556; 427/256, 261

(56) References Cited

U.S. PATENT DOCUMENTS

| 4,990,208 | 2/1991 | Kano | 156/275.3 |
|---|---|---|---|
| 5,399,220 | 3/1995 | Winslow | 156/273.3 |
| 5,743,965 | 4/1998 | Nishimura et al. | 118/712 |

FOREIGN PATENT DOCUMENTS

| 58-36417 | 3/1983 | (JP) . |
|---|---|---|
| 63-81639 | 4/1988 | (JP) . |
| 2-24848 | 1/1990 | (JP) . |
| 3-178409 | 8/1991 | (JP) . |
| 4-195942 | 7/1992 | (JP) . |

*Primary Examiner*—Michael W. Ball
*Assistant Examiner*—John T. Haran
(74) *Attorney, Agent, or Firm*—McDermott, Will & Emery (57) ABSTRACT

A disk bonding system or method comprises a first element for forming an annular adhesive layer on an upwardly facing joint surface of a lower side disk, and a second element for forming a dotted adhesive layer on a downwardly facing joint surface of an upper side disk. Then, a third element sets the upper and lower side disks in a confronting state, and reduces the spacing between the upper and lower side disks until the annular adhesive layer and the dotted adhesive layer are sandwiched between the upper and lower side disks. During this, the annular adhesive layer and the dotted adhesive layer are brought into contact with each other, and the contact region expands in a manner to prevent occurrence of bubbles.

29 Claims, 10 Drawing Sheets

DISK BONDING METHOD AND SYSTEM

BACKGROUND OF THE INVENTION

The present invention relates to technique of fabricating disks such as optical disks, and more specifically to technique for bonding a plurality of disk together into multilayer disks.

SUMMARY OF THE INVENTION

It is an object of the present invention to provide disk bonding method and system advantageous for excluding air bubbles from adhesive layers.

FIGS. 11~14 show a disk bonding system of related art. In an optical disk fabricating system 50 shown in FIG. 11, lower disks DL are placed one by one on a first turntable 51 at a position Q1 by a lower disk supplying section (not shown). At the position Q1, a lower disk DL is in a state in which its joint surface faces upwards. The lower disk is then conveyed by the turntable from the position Q1 through a position Q2 to a position Q3. At the position Q2, a nozzle N3 discharges adhesive so as to form an annular adhesive layer on the upwardly facing joint surface of the lower disk DL.

Figure 11:
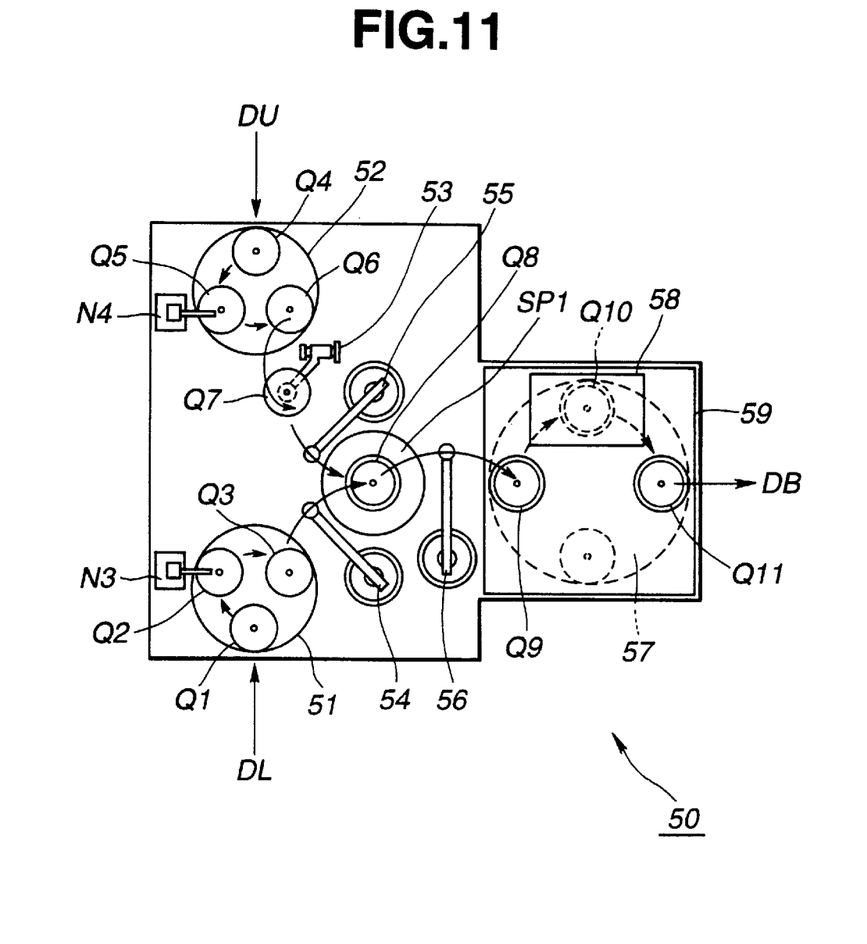
FIG. 11 is a view showing a disk bonding system of the comparable example.

Upper disks DU are placed one by one on a second turntable 52 at a position Q4 in a state having a joint surface facing upwards by a second disk supplying mechanism (not shown), and conveyed through a position Q5 to a position Q6 by the turntable 52. At the position Q5, a nozzle N4 discharges the adhesive so as to form an annular adhesive layer on the upwardly facing joint surface of the upper disk DU. An inverting arm mechanism 53 picks up the upper disk DU from the position Q6 and places the upper disk DU at a position Q7 in an inverted state with the joint surface facing downwards.

A transfer arm 54 transfers the lower disk DL from the position Q3 to a spinner SP1 at a position Q8. Then, a transfer arm 55 transfers the upper disk DU from the position Q7 to the spinner SP1 and places the upper disk DU on the lower disk DL.

In the spinner SP1, the upper and lower disks in the overlapped state are spun to spread the adhesive by the centrifugal force between the upper and lower disks. By this spin coating operation, the upper and lower disks are brought into a laminated disk DD with a uniform thin adhesive layer tightly sandwiched between the upper and lower disks. The laminated disk DD is not readily separable.

Thereafter, a transfer arm 56 transfers the laminated disk DD from the spinner SPY onto a turntable 57 at a position Q9, and the turntable 57 conveys the laminated disk DD from the position Q9 through a position Q10 to a position Q11. At the position Q10, an ultraviolet irradiating apparatus 58 irradiates ultraviolet rays to the laminate disk DD, and cures the intervening adhesive layer to complete a bonded disk DB. The turntable 57 is covered with a shield cover 59. Thus-completed bonded disks DB are discharged or unloaded one by one from the position Q11 by an unloading mechanism (not shown).

Figure 12:
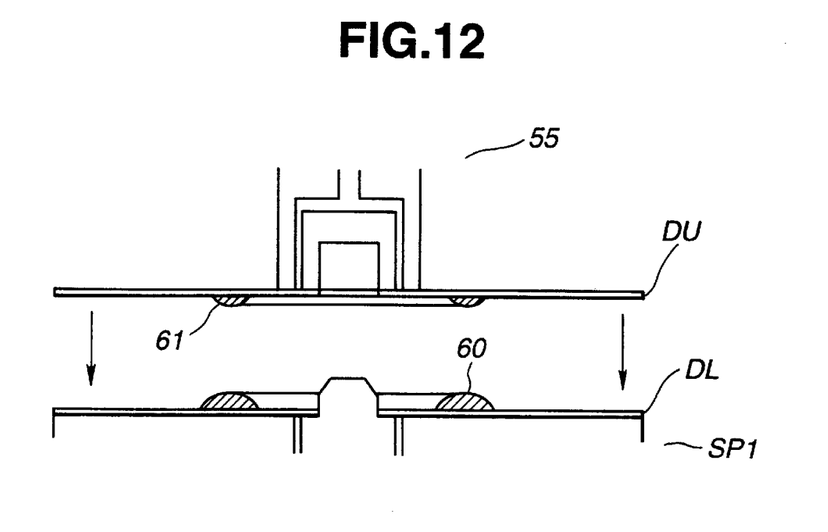
FIG. 12 is a view for illustrating a disk overlapping step in the comparable example.

FIG. 12 illustrates an overlapping operation for placing the upper disk DU held by the transfer arm 55, on the lower disk DL resting on the spinner SP1. Annular adhesive layers 60 and 61 are brought into contact with each other.

However, the disk bonding system of the related art is unable to prevent bubbles completely.

First, the annular adhesive layers 60 and 61 are microscopically irregular in shape. Therefore, contact regions or contact interface between the two adhesive layers 60 and 61 are distributed and spread irregularly, so that a considerable possibility arises that air is involved and bubbles are formed in the adhesive layers.

Second, the annular adhesive layers 60 and 61 are brought into contact with each other in substantially flat top regions. The substantially flat surfaces tend to trap air and form bubbles when the confronting flat surfaces come into contact with each other.

According to the knowledge the inventors of the present application have acquired, bubbles formed at the instant of contact between the adhesive layers are mostly minute in the range of 0.05 mm to 0.1 mm in diameter. The wettable surfaces of the adhesive layers function as the cause, presumably. Minute bubbles are troublesome because of the difficulty to expel minute bubbles in the spin coating operation.

Figure 13A:
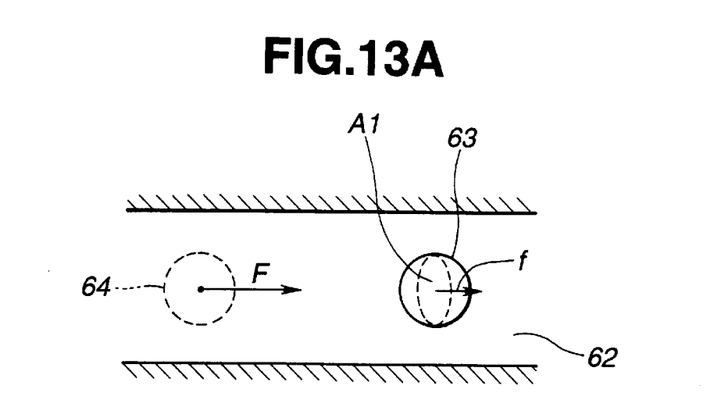
FIGS. 13A and 13B are views for illustrating forces acting on a large air bubble in an adhesive layer during a spin coating operation
Figure 13B:
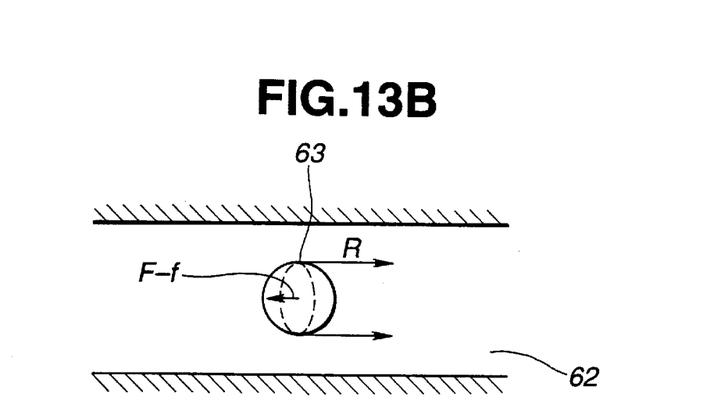
Figure 14:
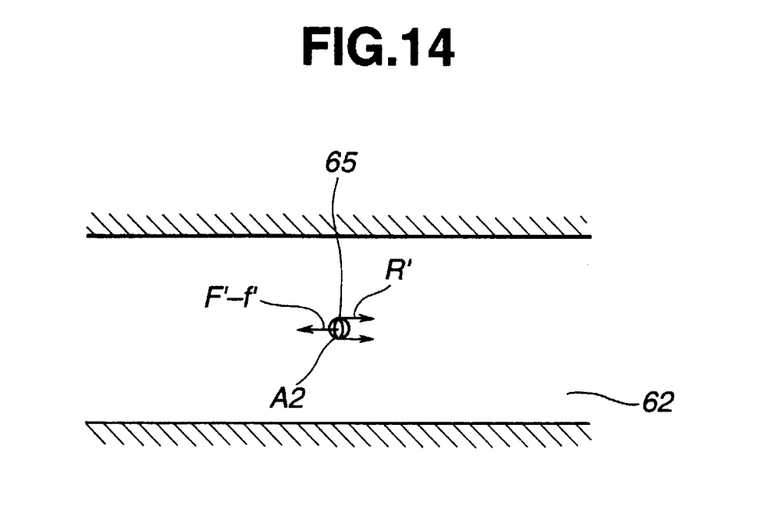
FIG. 14 is a view for illustrating forces acting on a small air bubble in an adhesive layer during a spin coating operation.

FIGS. 13A and 13B illustrate forces acting on a large air bubble 63 in the spin coating operation while FIG. 14 illustrates forces acting on a small bubble 65.

In FIGS. 13A and 13B, a centrifugal force is directed in the rightward direction due to the rotation. As shown in FIG. 13A, the large air bubble 63 exists in a liquid adhesive layer 62. The large air bubble 63 receives a centrifugal force f whereas a centrifugal force F acts on a fictitious liquid ball 64 assumed to have the same size and the same position. The large bubble 63 and the imaginary liquid ball 64 should coincide with each other although FIG. 13A shows as if they were at two separate positions, to avoid confusion.

FIG. 13B shows a relation among forces acting on the large bubble 63 when the liquid adhesive flows by the centrifugal force. In this field of flow, the large bubble 63 receives a force having a magnitude of F−f and a direction opposite to the centrifugal direction as the result of the centrifugal forces. A centrifugal force acting on a rotating object is proportional to the mass of the object, and the mass of air is smaller than the mass of the liquid adhesive of an equal volume. Therefore, the air bubble 63 receives a centrifugal force of a smaller magnitude than the surroundings. Namely, the air bubble 63 has an inherent tendency to lag behind the liquid adhesive flowing due to the centrifugal force.

The air bubble 63 further receives a friction force R caused by the viscosity of the liquid adhesive. The frictional force R acts in the centrifugal direction as shown in FIG. 13B. Consequently, whether the air bubble 63 is expelled together with the flowing adhesive is determined by the magnitude of the resulting force R+f−F acting in the centrifugal direction, or the magnitude of the frictional force R due to the viscosity. In the example of FIGS. 13A and 13B, the bubble 63 having a large projected area A1 with respect to the flow receives a large friction force R due to the viscosity of the liquid adhesive. The resulting strong force in the radial outward direction acts to expel the large bubble 63 from the adhesive layer 62.

The small bubble 65 shown in FIG. 14 receives a force F'−f due to the centrifugal force, and a force R' due to the viscosity of the adhesive, like the large bubble 63. In the case of the small bubble 65, however, a small projected area A2 relative to the flow reduces the frictional force R', and the resulting force acting to expel the small bubble 65 is weak and insufficient for the removal of the bubble.

The present invention offers methods and systems for effectively excluding bubbles.

According to the present invention, a disk bonding method or system for forming bonded disks by bonding disks together with adhesive comprises the following elements.

A first element is designed to form a first adhesive layer on a joint surface of a first disk by supplying the adhesive. The first adhesive layer is an annular adhesive layer.

A second element is designed to form a second adhesive layer on a joint surface of a second disk. The second adhesive layer is a dotted adhesive layer in a form of a plurality of dots arranged in a ring.

A third element is designed to overlap the first and second disks by decreasing a spacing between the first and second disks in a confronting state in which the joint surfaces of the first and second disks confront each other, and by bringing the first and second adhesive layers into contact with each other.

According to another aspect of the invention, a disk bonding system for forming multi-layer disks by bonding constituent disks together, comprises:

a first adhesive supplying section which forms an annular adhesive layer on a joint surface of a first constituent disk around a center of the first disk;

a second adhesive supplying section which forms a dotted adhesive layer on a joint surface of a second constituent disk around a center of the second disk, the dotted adhesive layer comprising a plurality of dot-shaped adhesive regions arranged in an imaginary circular plane curve encircling the center of the second disk; and an overlapping section which sets the first and second disks in an overlapped state in which the annular adhesive layer and the dotted adhesive layer are in contact with each other between the first and second disks.

DETAILED DESCRIPTION OF THE INVENTION

Figure 1:
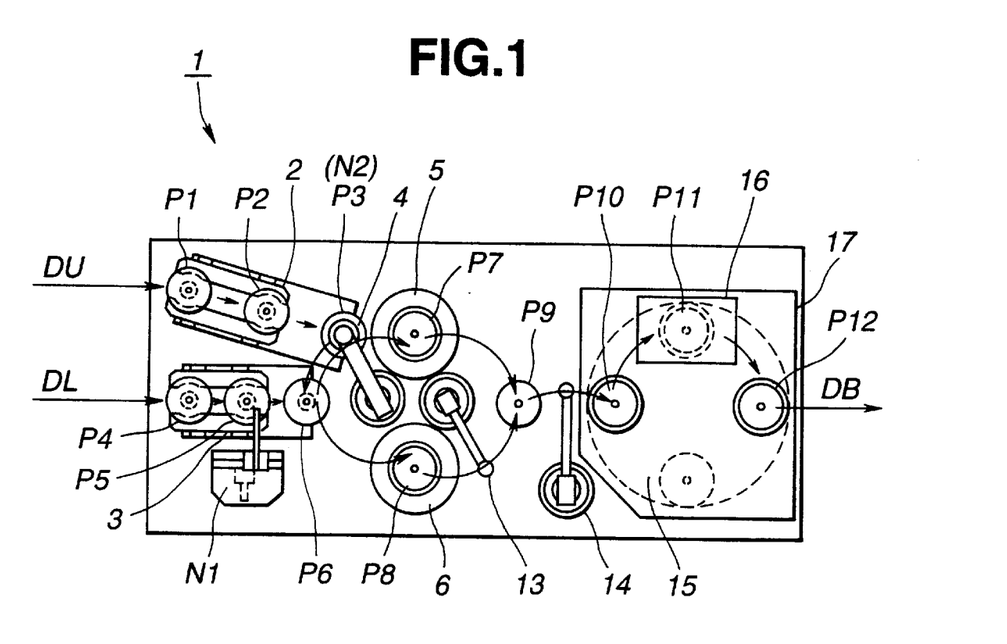
FIG. 1 is a schematic view showing a disk fabricating system according to one embodiment of the present invention.

FIG. 1 shows a disk fabricating system or apparatus 1 according to one embodiment of the present invention. This system is an optical disk fabricating system. The disk fabricating system 1 comprises the following components.

A slider 2 is an apparatus for conveying single-layer disks one by one at a constant pitch. Upper (or upper side) single-layer disks DU are placed one after another at a position P1 on the slider 2 by a disk supplying apparatus (not shown in FIG. 1). At the position P1, each upper disk DU is placed in a state in which a joint surface (or adhesion surface) faces downwards. Thereafter, each upper disk DU is delivered by the slider 2 through a point P2 to a point P3.

A slider 3 is also an apparatus for conveying single-layer disks one by one at a constant pitch. Lower (or lower side) single-layer disks DL are placed one by one at a position P4 on the slider 3 by a disk supplying apparatus (not shown in FIG. 1). At the position P4, each lower disk DL is placed in a state in which a joint surface (or adhesion surface) faces upwards. Thereafter, each lower disk DL is delivered by the slider 3 through a point P5 to a point P6.

A first adhesive supplying nozzle unit N1 supplies adhesive on the joint surface of each lower disk DL at the position P5. The nozzle unit N1 of this example comprises a rotary nozzle for supplying the adhesive onto a lower disk DL while rotating. When a lower disk DL is held stationary at the position P5, the rotary nozzle rotates and simultaneously supplies the adhesive onto the lower disk DL at the position PS to form an annular layer of the adhesive on the lower disk DL.

A transfer mechanism 4 brings an upper disk DU at the position P3 and a lower disk DL at the position P6 into an overlapped state and transfers the lower and upper disks DL and DU in the overlapped state to a spin coating section. In this example, the spin coating section comprises a first spinner 5 located at a position P7 and a second spinner 6 at a position P8. For example, a series of pairs of the lower and upper disks DL and DU in the overlapped state are transferred alternately to the first and second spinners 5 and 6 by the transfer mechanism 4.

Figure 2:
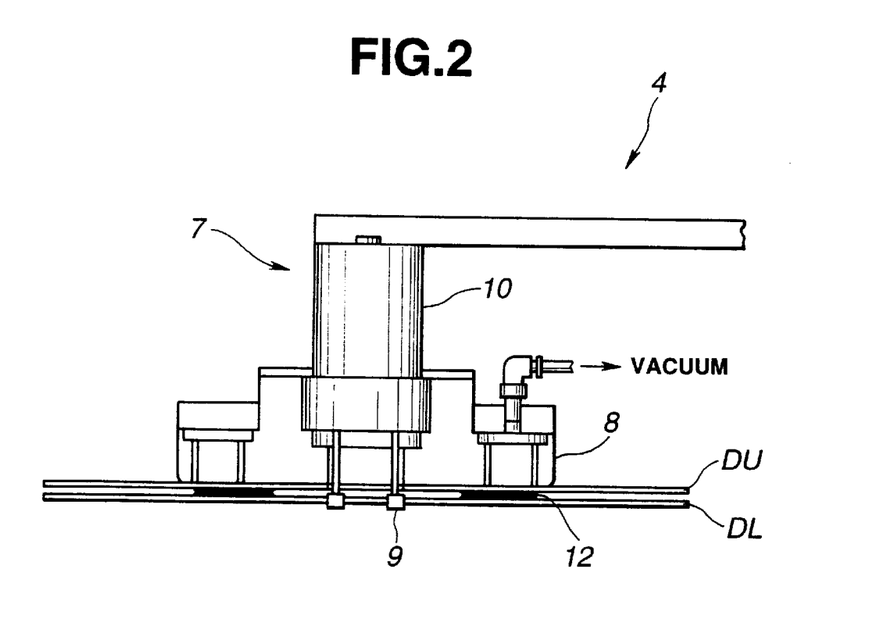
FIG. 2 is a schematic view showing the structure of a disk transfer mechanism 4 shown in FIG. 1.

The transfer mechanism 4 comprises a disk holding section 7 as shown in FIG. 2. The disk holding section 7 comprises a vacuum sucking device 8 for holding an upper disk DU with vacuum suction, a chucking device 9 for gripping a center hole of a lower disk DL, and an air cylinder unit 10 for driving the chucking device 9. The chucking device 9 of this example has three claws projecting downwards. However, for the purpose of simplification, FIG. 2 shows as if there were only two of the claws.

Reverting to FIG. 1, the transfer mechanism 4 first picks up an upper disk DU with the vacuum sucking device 8 at the position P3, then transfers the upper disk DU to the position P6, grips a lower disk DL at the position P6 with the chucking device 9, and transfers the lower and upper disks DL and DU to the spinner 5 or 6.

A second adhesive supplying unit N2 is provided at the position P3. In this example, the second adhesive supplying unit N2 is in the form of an upward adhesive discharging mechanism designed to form a liquid adhesive layer on a downward facing joint surface of an upper disk DU. The liquid adhesive layer formed on the downward facing joint surface by the upward adhesive discharging mechanism N2 is a dotted layer in the form of a plurality of dots arranged in an imaginary circular curve. The dotted adhesive layer formed on an upper disk DU and the annular adhesive layer formed on a lower disk DL are sandwiched between the upper and lower disks DU and DL and formed into an intervening liquid adhesive layer 12, by the transfer mechanism 4.

Each spinner 5 or 6 spreads the intervening liquid adhesive layer 12 sandwiched between the overlying upper disk DU and the underlying lower disk DL to a predetermined wider region by spinning the disks DU and DL in the overlapped state. By this spin coating operation, a pair of upper and lower disks DU and DL is formed into a contact dual (or laminated) disk DD.

A disk conveying arm mechanism 13 conveys contact dual disks DD one by one from the spinners 5 and 6 to a position P9. From the position P9, a disk conveying arm mechanism 14 conveys each contact dual disk DD to a position P10.

A turntable 15 conveys each contact disk DD from the position P10 on the turntable 15 through a position P11 to a position P12.

An ultraviolet irradiating unit 16 provided at the position P11 cures, and makes hard, the intervening adhesive layer 12 in each contact dual disk DD by ultraviolet radiation. By this curing operation, the contact dual disk DD is formed into a complete bonded disk DB. The turntable 15 is covered by a shading cover 17 for preventing escape of ultraviolet radiation.

The bonded disks DB are unloaded at the position P12 by an unloading unit (not shown in FIG. 1).

Figure 3:
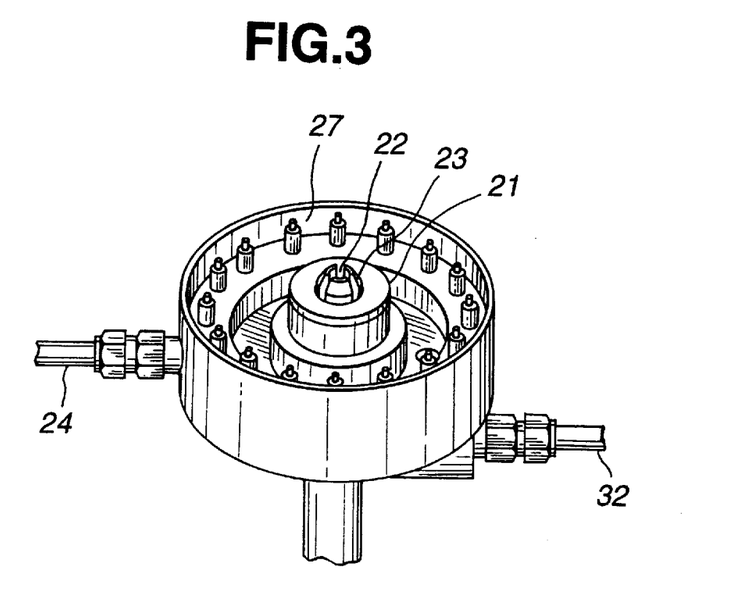
FIG. 3 is a schematic perspective view showing an upward adhesive discharge mechanism N2 having a multi-point nozzle section 19 in the system of FIG. 1.
Figure 4:
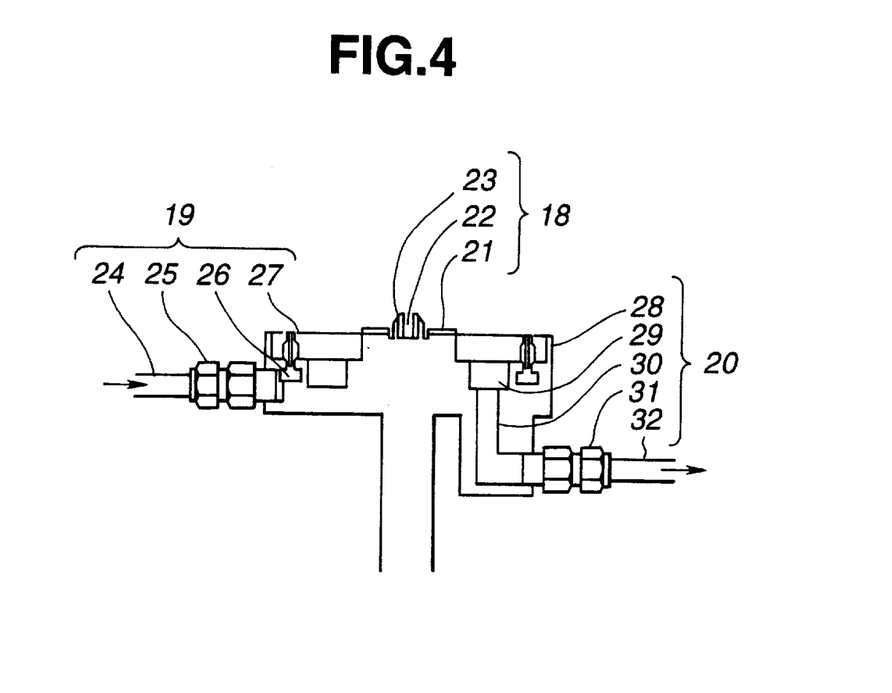
FIG. 4 is a schematic sectional view showing the upward adhesive discharge mechanism N2 of FIG. 3.

FIGS. 3 and 4 show the upward adhesive discharging mechanism of the second adhesive supplying unit N2. The upward discharge mechanism N2 comprises a stage section 18 for supporting an upper disk DU, a multiple-point nozzle section 19 (nozzle system or adhesive discharging system) for discharging the adhesive, a liquid recovery section 20 for recovering a surplus of the adhesive, and a drive mechanism (not shown in FIGS. 3 and 4) for moving the discharge mechanism N2 up and down.

The stage section 18 comprises a base seat 21 and an upright center hub 23 formed with notches 22 for receiving the claws of the chucking device 9. An upper disk DU can rest snugly on the base seat 21 with the projecting hub 23 inserted fittingly into the center hole of the upper disk DU. The base seat 21 may be formed with at least one suction hole for vacuum-sucking an upper disk DU.

The multiple-point nozzle section 19 comprises a liquid adhesive supplying pipe 24, a joint 25, a liquid adhesive supply passage 26 and a plurality of nozzle members 27. In the illustrated example, there are sixteen of the nozzle members 27 arranged regularly in a circle around the center hub 23. Each nozzle member 27 of this example extends vertically and has a discharge hole at the upper end. The diameter of the circle in which the nozzle members 27 are arranged is slightly greater than the outside diameter of the annular layer formed by the first adhesive supplying nozzle unit N1 on a lower disk DL. Thus, the nozzle members 27 are located outside the annular region of the adhesive on the lower disk DL. The supply pipe 24 is connected through a valve (not shown) to a pressure tank (not shown).

The liquid adhesive recovery section 20 comprises a cylindrical wall 28, a recovery groove 29, a recovery passage 30, a joint 31 and a recovery pipe 32 leading to a recovery tank (not shown).

FIGS. 5A~5D are views for illustrating a sequence of operations of the upward adhesive discharging mechanism N2. The operations are performed in the order of FIGS. 5A, 5B. 5C and 5D.

Figure 5A:
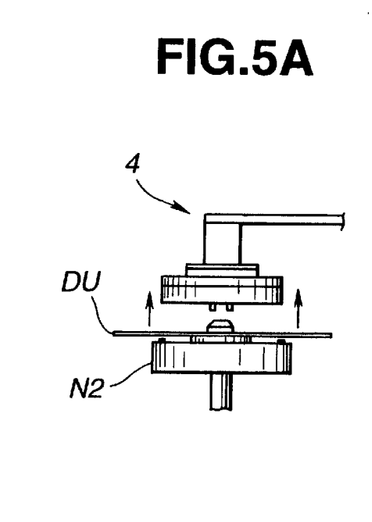
FIGS. 5A~5D are schematic views for showing a sequence of operations in a step for forming a dotted adhesive layer on a downwardly facing disk surface with the discharge mechanism N2 shown in FIGS. 3 and 4.
Figure 5B:
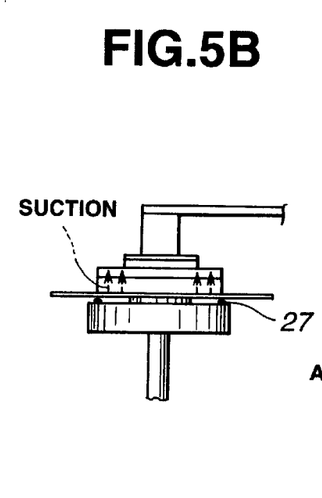
Figure 5C:
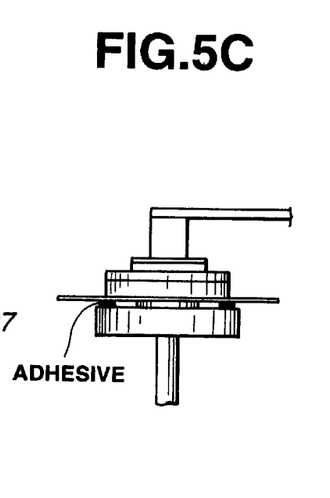
Figure 5D:
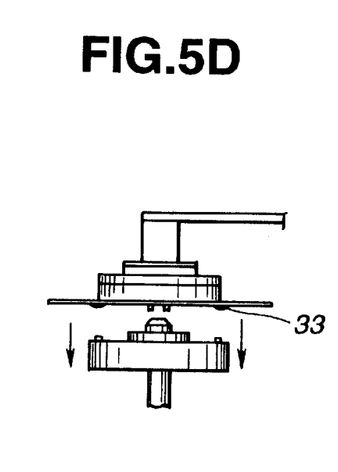

FIG. 5A shows a state in which an upper disk DU is placed on the base seat 21 of the upward discharging mechanism N2. From this state, the upward discharging mechanism N2 moves upwards toward the holding section 7 of the transfer mechanism 4 until the upward discharging mechanism N2 reaches an uppermost position as shown in FIG. 5B. In the state shown in FIG. 5B, the transfer mechanism 4 sucks the upper disk DU by the action of vacuum. Then, the valve (not shown) is opened and the multiple-point nozzle section 19 starts ejecting the liquid adhesive as shown in FIG. 5C. After the elapse of a preset time duration, the nozzle section 19 terminates the ejection of the adhesive. Thereafter, the discharging mechanism N2 moves downwards as shown in FIG. 5D. During this, an excess of the adhesive falls by being drawn downwards together with the descending nozzle members 27. As a result, there is formed on the downwardly facing surface of the upper disk DU a liquid adhesive layer or film 33 having an approximately constant volume. The quantity of the liquid adhesive layer 33 is determined by the viscosity and surface tension of the liquid adhesive, the distance between an upper disk DU and the nozzle members 27 and the discharge pressure. In this example, the viscosity of the adhesive is in a range from about 200 centipoise to about 1000 centipoise. In this case, a preferable range of the distance between an upper disk DU and the nozzle members 27 is from 0.5 mm to 2 mm.

FIGS. 6A~6D show a sequence of operations of an up-and-down stage 34 provided at the position P6. An upper disk DU and a lower disk DL are overlapped by the operations in the order of FIGS. 6A, 6B, 6C and 6D.

Figure 6A:
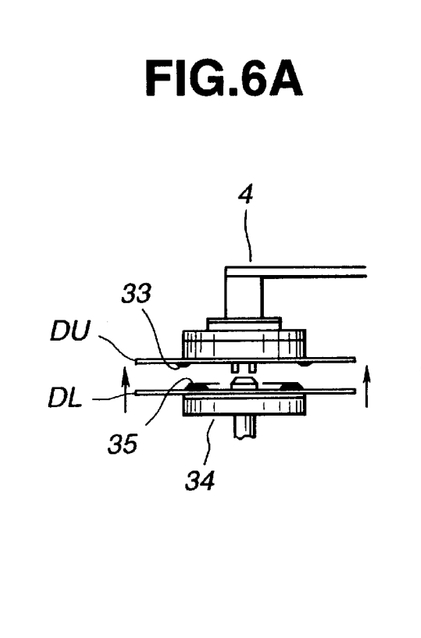
FIGS. 6A~6D are schematic views for showing a sequence of operation in a step for sandwiching adhesive layers between upper and lower disks in the system of FIG. 1.

FIG. 6A shows a state in which a lower disk DL is placed on the up-and-down stage 34. The lower disk DL has an annular liquid adhesive layer or film 35 formed on the upwardly facing surface of the lower disk DL. The transfer mechanism 4 stands by, holding an upper disk DU with the holding section 7 just above the up-and-down stage 34. The upper disk DU has a liquid adhesive layer or film 33 formed on the downwardly facing surface of the upper disk DU.

Figure 6B:
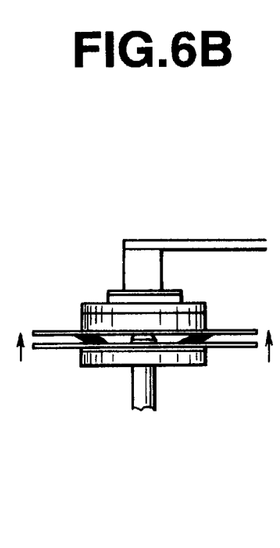

From the state of FIG. 6A, the up-and-down stage 34 moves upwards, and the adhesive layers 33 and 35 are brought into contact with each other as shown in FIG. 6B. The adhesive layers 33 and 35 first touch each other at a position spaced from the circular center line of the annular adhesive layer 35, spaced from the circular center line of the adhesive layer 33, and located radially between both center lines.

Figure 6C:
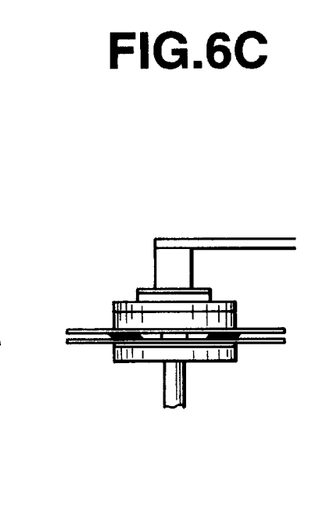
Figure 6D:
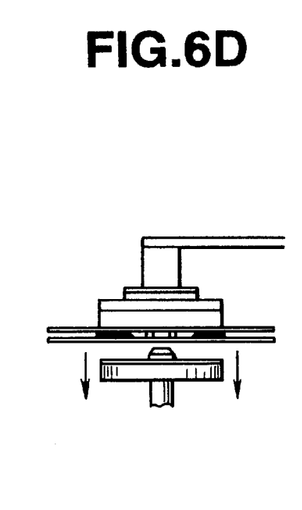

FIG. 6C shows a state in which the up-and-down stage 34 reaches an uppermost position. In this state, the chucking device 9 of the transfer mechanism 4 grips the lower disk DL by expanding the claws radially. Thereafter, the up-and-down stage 34 moves downwards as shown in FIG. 6D.

Figure 7:
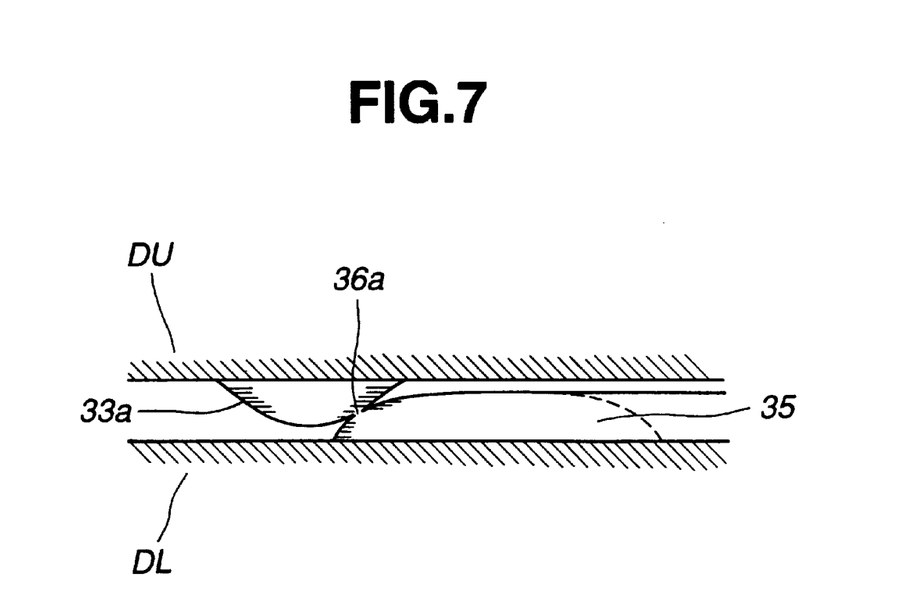
FIG. 7 is a schematic sectional view illustrating contact between a dot-shaped adhesive region 33a and an annular adhesive layer 35 in the system of FIG. 1.
Figure 8:
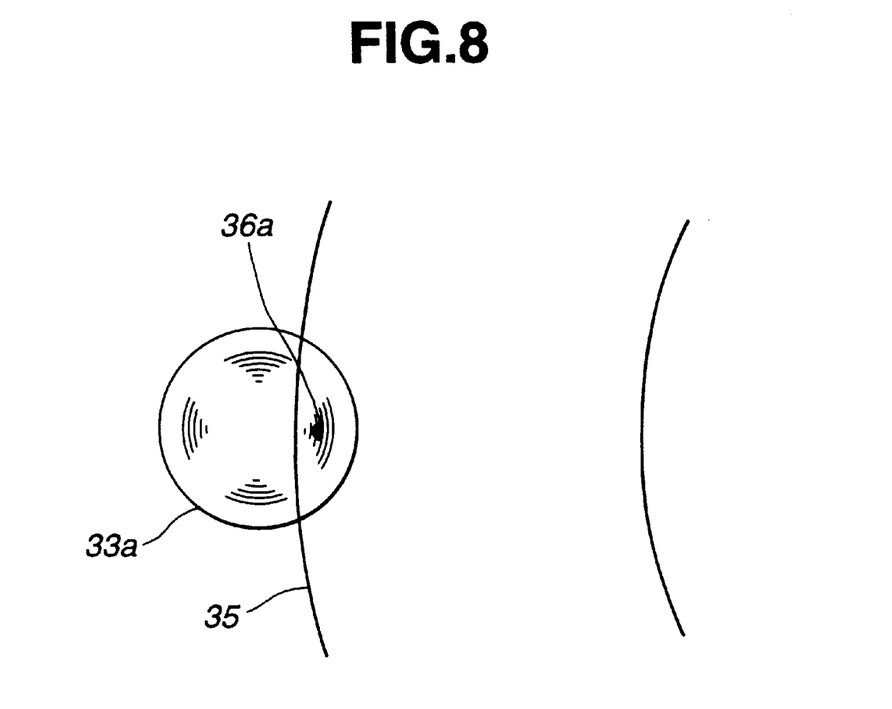
FIG. 8 is a schematic plan view illustrating the contact between the dot-shaped adhesive region 33a and the annular adhesive layer shown in FIG. 7.

FIGS. 7 and 8 show the liquid adhesive layers 33 and 35 at the instant of contact as viewed from horizontal and vertical directions. The adhesive layer 33 formed by the multiple-point nozzle section 19 of the upward discharge mechanism N2 is in the form of a plurality of dots arranged in a circle at regular intervals around the center of the upper disk DU. The adhesive layer 33 is a dotted adhesive layer consisting of a plurality of dot-shaped adhesive regions (or dot regions) 33a. Each dot-shaped region 33a is an isolated mass of the adhesive resembling an island. The adhesive layer 35 on the lower disk DL is in the form of a continuous annular streak around the center of the lower disk DL. As shown in FIG. 8, each dot region 33a is a small circular region, and the annular layer 35 is a stripe region extending around the center. In this example, the center of each dot region 33a is outside the circular outside periphery of the annular layer 35. As shown in FIG. 7, the dot region 33a has a hemispherical convex surface bulging downwards toward the lower disk DL, and the annular layer 35 has a convex surface bulging upwards toward the upper disk DU. Accordingly, each dot region 33a comes into contact with the annular layer 35 at a contact region 36a which is initially in the form of a point.

FIGS. 9A~9E illustrate how contact regions 36a expand.

Figure 9A:
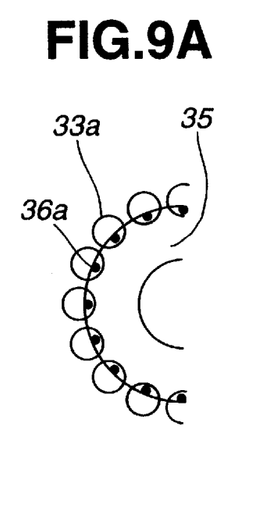
FIGS. 9A~9E are schematic views for showing a sequence of stages in a step of spreading contact regions 36a between annular and dotted adhesive layers in the system of FIG. 1.

FIG. 9A shows the contact regions 36a at the instant of contact. The dot regions 33a are regularly arranged in an imaginary circle concentric with the annular layer 35. The contact regions 36a are arranged along the outside circular boundary of the annular layer 35. In the example shown in FIG. 9A, the radial distance of the center of each dot region 33a from the common center axis of the upper and lower disks DU and DL is slightly greater than the radius of the circular outside periphery of the annular layer 35.

Figure 9B:
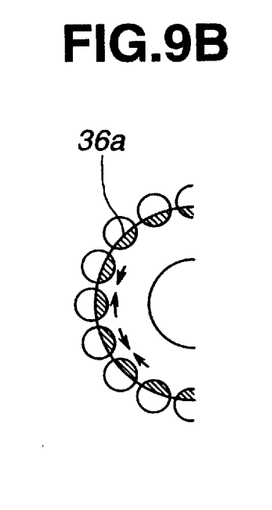
Figure 9C:
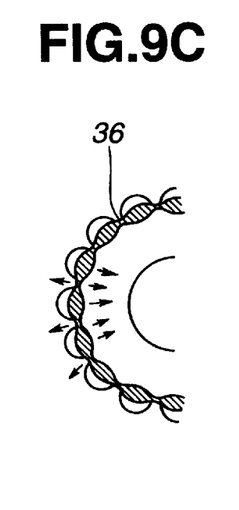

In a next stage as shown in FIG. 9B, each isolated contact region 36a expands circumferentially along the outside periphery of the annular layer 35. In a stage of FIG. 9C, the individual contact regions 36a are connected together into a continuous annular contact region 36 like a string of beads. In this stage, each contact region 36a extends along the outside periphery of the annular layer 35, and each contact region 36a is narrow in width. Accordingly, two adjacent contact regions 36a touch each other with their projecting ends in such a manner as to exclude air and prevent bubbles.

Figure 9D:
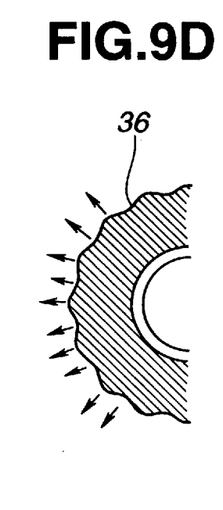
Figure 9E:
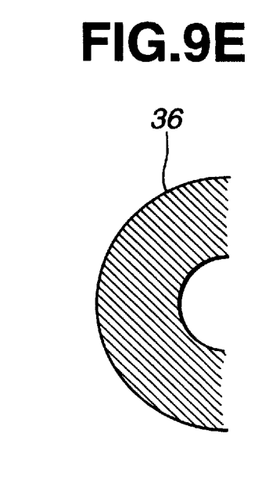

Then, the continuous annular contact region 36 expands radially as shown in FIG. 9D. The contact region 36 spreads faster in the radial inward direction because there extends the annular adhesive layer 35 on the inner side and the wettability is good between the liquid adhesive regions. On the radial outer side, the wettability between the liquid adhesive and the disk surface is poor, and the contact region 36 spreads slower in the radial outward direction. This difference between the inner and outer sides helps attain a proper balance between the times for the contact region 36 to reach the inner and outer boundaries, and causes the adhesive layer to spread in a proper radial range. FIG. 9E shows a state in which the contact region 36 expands over the entirety. From the stage of FIG. 9C to the stage of FIG. 9E, the contact region 36 expands in a manner to exclude the air, so that no bubbles are involved in the adhesive layer.

Single-layer disks stored for a long time after the fabrication tend to be low in the wettability of disk surfaces. In such a case, the contact region 36 may lag, within a restricted area, in spreading radially outwards, and cause the air to be confined and form bubbles. However, bubbles are generally formed on the radial outer side in the disk bonding system according to the embodiment, so that bubbles can be readily dispelled outwards by the subsequent spin coating operation.

Figure 10A:
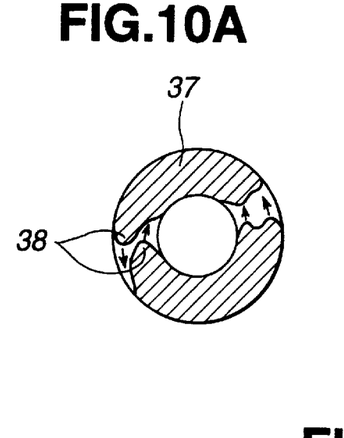
FIGS. 10A and 10B are views illustrating a process of formation of bubbles in a comparable example of related art.
Figure 10B:
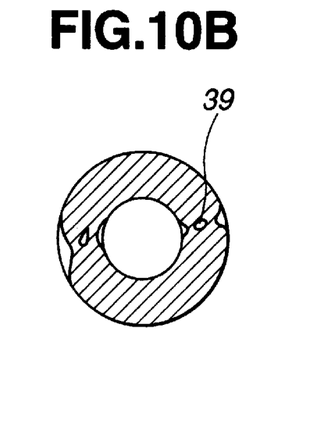

In a comparable example shown in FIGS. 10A and 10B, contact regions 37 are wide and liable to cause a bubble, unlike the process shown in FIGS. 9A~9E according to the present invention. The wide contact regions 37 as shown in FIG. 10A of the comparable example tend to have a projecting end 38 which is out of alignment with an adjacent projecting end 38, or to have two or more projections. Therefore, the adjacent ends 38 are liable to confine air and cause bubbles 39 by forming an overlapping, covering or enclosing shape. The process shown in FIGS. 9A~9E according to the present invention forms a sharp contrast to the process of the comparable example shown in FIGS. 10A and 10B.

Figure 15:
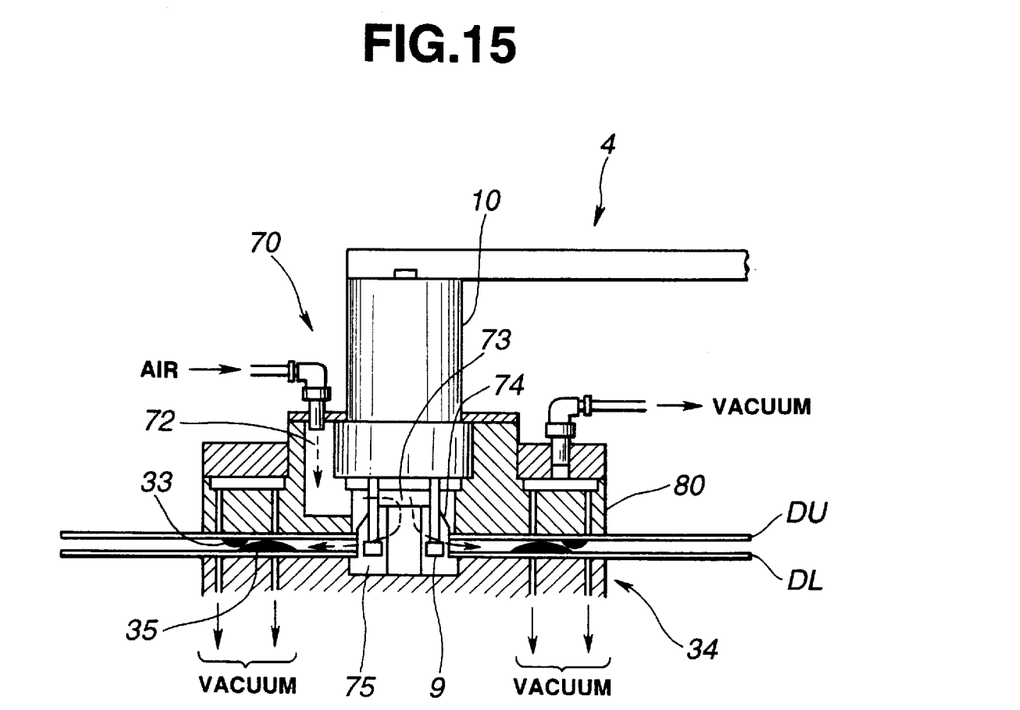
FIG. 15 is a schematic view showing a disk transfer mechanism of another design which can be used in the system of FIG. 1.

FIG. 15 shows a variation of the disk transfer mechanism 4 in the disk bonding system shown in FIG. 1. FIG. 15 shows the disk transfer mechanism 4 and the up-and-down stage 34 in a state immediately before the state shown in FIG. 6B. At the instant shown in FIG. 15, an annular adhesive layer 35 on a lower disk DL and a dotted adhesive layer 33 on an upper disk DU are just about to contact with each other.

In the practical example shown in FIG. 15, a disk holding section 70 of the disk transfer mechanism 4 comprises a vacuum sucking device 80 which is different from the vacuum sucking device 8 of the disk holding section 7 shown in FIG. 2. The vacuum sucking device 80 is formed with an air passage 72 for introducing air stream. An air supplying pipe and a pipe joint are connected to the inlet end of the air passage 72. The air passage 72 opens into a center bore 73 opening downwards to allow the chucking device 9 to extend downwards.

Like the stage section 18 of the upward adhesive discharge mechanism N2, the up-and-down stage 34 has an upwardly projecting center hub 74 formed with notches 75 for receiving the claws of the chucking device 9 of the transfer mechanism 4. These claws of the chucking device 9 project downwards to grip a lower disk DL resting on the up-and-down stage 34. The center hub 74 formed with the notches 75 functions in the same manner as the upright center hub 23 with the notches 22. The up-and-down stage 34 moves upwards to raise a lower disk DL until the center hub 23 fits into the center bore 73 of the disk holding section 70 of the transfer mechanism 4, and the claws of the chucking device 9 enter the notches 75 of the center hub 23. In the state of FIG. 15, the upright center hub 74 of the up-and-down stage 34 fits into the center holes of lower and upper disks DL and DU from below, and the claws of the chucking device 9 enter the center holes of the upper and lower disks DU and DL from above through the notches 75 of the center hub 74.

In the state of FIG. 15, the up-and-down stage 34 is about to reach the uppermost position to hand over a lower disk DL to the transfer mechanism 4, the lower disk DL gripped by the up-and-down stage 34 with the aid of vacuum suction is very close to the upper disk DU gripped by the disk holding section 70, and the annular adhesive layer 35 is just about to touch the dotted adhesive layer 33. As shown in FIG. 15, the center hub 23 fits into the center bore 73 of the disk holding section 70, and the claws of the chucking device 9 enter the notches 75 of the center hub 23. In this state, the air passage 72, the upright center bore 73 and the notches 75 are connected together. The notches 75 open radially outwardly into the interspace between the upper and lower disks DU and DL. Therefore, air streams are produced as shown by arrows of broken lines when air is supplied from a supply unit (not shown) into the air passage 72. In the interspace between the upper and lower disks DU and DL, the air streams flow radially outwardly from the center. In practice, the supply of air is started in the middle of the upward movement of the up-and-down stage 34 when the upper and lower disks are still spaced apart, and the supply of air is terminated at an instant immediately before the adhesive layers 33 and 35 contact with each other. The air streams are not influential when the upper and lower disks are wide apart from each other. Therefore, the timing of starting the air supply does not require a highly accurate control whereas the control of the timing of terminating the supply of air requires care.

It is optional to perform these operations in the state in which a lower disk DL is merely placed on the up-and-down stage 34 without the help of vacuum suction. The omission of vacuum suction in the up-and-down stage 34 is effective especially when a single-layer disk has such a deformity that the vacuum suction cannot correct a local warp in the joint surface. In the stage of FIG. 9B, the up-and-down stage 34 allows a lower disk DL to be raised slightly by the surface tension of the liquid adhesive, and thereby allows the contact regions 36a to spread without being hindered by the warp of the joint surface, and without causing bubbles.

Figure 16A:
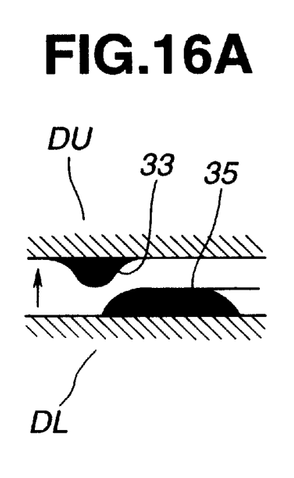
FIGS. 16A~16D are views showing a sequence of stages in a disk overlapping step with the disk transfer mechanism of FIG. 15.

FIGS. 16A–16D illustrate operations of the disk transfer mechanism 4 shown in FIG. 15. As the up-and-down stage 34 moves upwards, adhesive layers 33 and 35 alter their shapes in the order of FIGS. 16A, 16B, 16C and 16D. FIG. 16A shows a state in which the up-and-down stage 34 starts moving upwards.

Figure 16B:
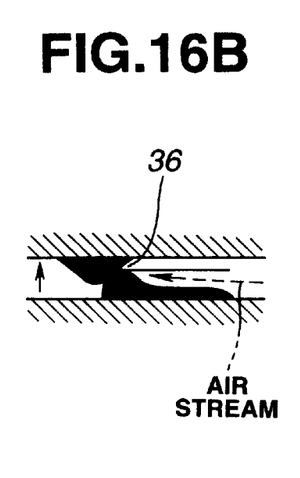

In a state shown in FIG. 16B, the adhesive layers 33 and 35 are very close to each other, and air streams flow radially outwardly in the interspace between the upper and lower disks DU and DL, from the central region of the interspace. The adhesive layer 33 is a dotted layer, the adhesive layer 35 is a continuous annular layer, and the dotted adhesive layer 33 surrounds the annular adhesive layer 35. Therefore, the radial air stream raises the outside peripheral portion of the annular layer 35, pushes the raised portion radially outwardly and forces the raised portion to contact with the dotted layer 33. By the action of the radial air stream, the adhesive layers 33 and 35 come into contact with each other in the state in which the spacing between the upper and lower disks DU and DL is still wider than in the example of FIG. 7.

Figure 16C:
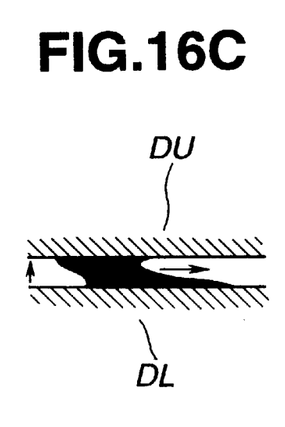
Figure 16D:
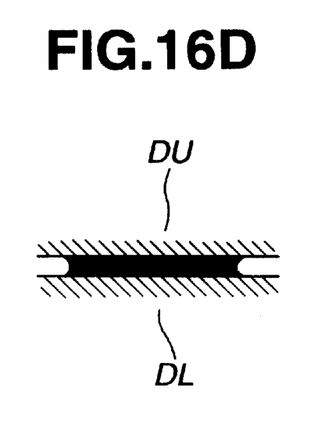

In the state of FIG. 16C, the up-and-down stage 34 is at a higher level, and the air streams are already shut off. The stage of FIG. 16C corresponds to the stage of FIG. 9C. The contact region expands radially inwardly. In the stage of FIG. 16D, the up-and-down stage 34 reaches an uppermost position.

In the example of FIG. 15, the overlapping mechanism of the transfer mechanism 4 and the up-and-down stage 34 can bring the adhesive layers 33 and 35 into contact with each other in the state where the spacing between the upper and lower disks is still wide. Therefore, the overlapping mechanism of FIG. 15 ensures the contact between the adhesive layers before the contact between the adhesive and a disk surface, and thereby prevent bubbles even if single-layer disks have deformities and dot regions 33a are irregular in size.

Figure 17:
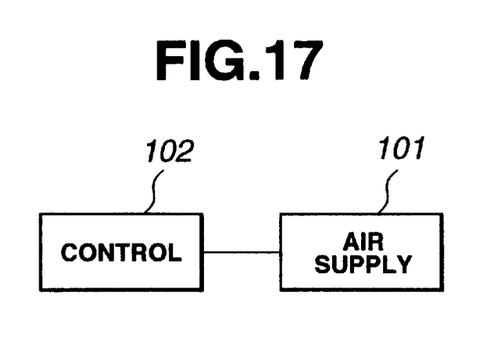
FIG. 17 is a block diagram showing an air supplying section and a control section employed in the example of FIG. 15.

As shown in FIG. 17, an air supplying section 101 is a section for producing the radial air streams between upper and lower disks DU and DL, and a control section 102 is a section for shutting off the radial air streams just before the annular adhesive layer 35 and the dotted adhesive layer 33 come into contact with each other. The control section 102 may comprise a controller for controlling the up-and-down stage 34, the transfer mechanism 4 and the other components of the disk fabricating system.

According to the present invention, the annular adhesive layer and the dotted adhesive layer are brought into contact with each other substantially in a manner of point contact, so that the possibility of bubbles significantly diminishes. Moreover, the contact regions between the annular adhesive layer and the dotted adhesive layer expand in a manner to exclude bubbles. The methods and systems according to the present invention facilitate the control of the thickness of adhesive layers.

Although the invention has been described above with reference to the illustrated embodiment of the invention, the invention is not limited to the embodiment described above. Modifications and variations of the embodiment will occur to those skilled in the art in light of the above teachings. The scope of the invention is defined with reference to the following claims.

What is claimed is:

1. A disk bonding method for forming bonded disks by bonding disks together with adhesive, the bonding method comprising:

a first adhesive supplying step of forming a first adhesive layer on a joint surface of a first disk by supplying the adhesive, the first adhesive layer being an annular adhesive layer;

a second adhesive supplying step of forming a second adhesive layer on a joint surface of a second disk, the second adhesive layer being a dotted adhesive layer in a form of a plurality of dots arranged in a ring; and an overlapping step of overlapping the first and second disks by decreasing a spacing between the first and second disks in a confronting state in which the joint surfaces of the first and second disks confront each other, and bringing the first and second adhesive layers into contact with each other.

2. The disk bonding method as claimed in claim 1 wherein the disk bonding method is an optical disk bonding method for fabricating optical disks by bonding two single-layer disks together into a bonded multi-layer disk, the first disk is a lower disk, the second disk is an upper disk, the first adhesive supplying step comprises an operation of discharging the adhesive in an annular form onto the joint surface of the first disk held in a state in which the joint surface of the first disk faces upwards, and the second adhesive layer formed by the second adhesive supplying step is in the form of a plurality of dots arranged in an imaginary circle.

3. The disk bonding method as claimed in claim 1 wherein the disk bonding method further comprises a spin coating step of spinning the first and second disks to spread the adhesive between the first and second disks which are set by the overlapping step in an overlapped state.

4. The disk bonding method as claimed in claim 1 wherein the second adhesive layer formed by the second adhesive supplying step comprises a plurality of dot-shaped adhesive regions which are greater than four in number, and which are arranged at regular intervals in an imaginary circle.

5. The disk bonding method as claimed in claim 1 wherein the second adhesive layer is formed at a second radial position on the second disk while the first adhesive layer is formed at a first radial position on the first disk, and a radial distance of the second radial position of the second adhesive layer from a center of the second disk is greater than a radial distance of the first radial position of the first adhesive layer from a center of the first disk.

6. The disk bonding method as claimed in claim 1 wherein the second adhesive layer formed by the second adhesive supplying step comprises a plurality of dot-shaped adhesive regions which are arranged regularly in a circle, and an interval between adjacent two of the dot-shaped adhesive regions is shorter than 30 mm.

7. The disk bonding method as claimed in claim 1 wherein the second adhesive supplying step comprises an operation for discharging the adhesive upwards from a lower position below the second disk to form the dotted adhesive layer.

8. The disk bonding method as claimed in claim 7 wherein, in the second adhesive supplying step, a distance between a nozzle for discharging the adhesive from the lower position and the joint surface of the second disk is in a range from 0.5 mm to 2 mm.

9. The disk bonding method as claimed in claim 1 wherein the overlapping step comprises an operation for producing a radial air stream between the first and second disks during an operation of decreasing the spacing between the first and second disks in the confronting state, the radial air stream being a stream flowing radially outwardly from a central zone of the first and second disks.

10. The disk bonding method as claimed in claim 9 wherein the operation of producing the radial air stream is stopped immediately before the first and second adhesive layers come into contact with each other.

11. A disk bonding system for forming bonded disks by bonding disks together with adhesive, the bonding system comprising:
   a first adhesive supplying section for forming a first adhesive layer on a joint surface of a first disk by supplying the adhesive, the first adhesive layer being an annular adhesive layer;
   a second adhesive supplying section for forming a second adhesive layer on a joint surface of a second disk by supplying the adhesive, the second adhesive layer being a dotted adhesive layer that is in a form of a plurality of dots arranged in a ring; and
   an overlapping section for overlapping the first and second disks by decreasing a spacing between the first and second disks in a confronting state in which the joint surfaces of the first and second disks confront each other, and bringing the first and second adhesive layers into contact with each other.

12. The disk bonding system as claimed in claim 11 wherein the disk bonding system is an optical disk bonding system for fabricating optical disks by bonding two single-layer disks together into a single bonded multi-layer disk, the first disk is a lower disk, the second disk is an upper disk, the first adhesive supplying unit comprises a nozzle member for discharging the adhesive in an annular form onto the joint surface of the first disk held in a state in which the joint surface of the first disk faces upwards, and the second adhesive supplying section comprises a nozzle member for forming the second adhesive layer in the form of a plurality of dots arranged in an imaginary circle.

13. The disk bonding system as claimed in claim 11 wherein the disk bonding system further comprises a spin coating section for spinning the first and second disks to spread the adhesive between the first and second disks set in an overlapped state by the overlapping section.

14. The disk bonding system as claimed in claim 11 wherein the second adhesive supplying section comprises an adhesive discharging system forming the second adhesive layer which comprises a plurality of dot-shaped adhesive regions which are isolated from each other, which are greater than four in number, and which are arranged at regular intervals in an imaginary circle.

15. The disk bonding system as claimed in claim 11 wherein, in the confronting state, the second adhesive layer is located outside the first adhesive layer.

16. The disk bonding system as claimed in claim 11 wherein the second adhesive supplying section comprises a nozzle system which forms a plurality of dot-shaped adhesive regions arranged regularly in a circle.

17. The disk bonding system as claimed in claim 11 wherein the second adhesive supplying section comprises an adhesive discharging system for discharging the adhesive upwards from a lower position below the second disk to form the second adhesive layer.

18. The disk bonding system as claimed in claim 17 wherein the adhesive discharging system of the second adhesive supplying section comprises at least one nozzle aimed upwards, and spaced vertically from the joint surface of the second disk at a vertical distance in a range from 0.5 mm to 2 mm during an operation of discharging the adhesive toward the joint surface of the second disk.

19. The disk bonding system as claimed in claim 11 wherein the overlapping section comprises a means for producing a radial air stream flowing radially from a central zone of an interspace between the first and second disks while the spacing between the first and second disks is decreased in the confronting state.

20. The disk bonding system as claimed in claim 19 wherein the disk bonding system comprises a control means for stopping the radial air stream just before the first and second adhesive layers come into contact with each other.

21. A disk bonding system for forming multi-layer disks by bonding constituent disks together, the bonding system comprising:
   a first adhesive supplying section which forms an annular adhesive layer on a joint surface of a first constituent disk around a center of the first disk;
   a second adhesive supplying section which forms a dotted adhesive layer on a joint surface of a second constituent disk around a center of the second disk, the dotted adhesive layer comprising a plurality of dot-shaped adhesive regions arranged in an imaginary circular plane curve encircling the center of the second disk; and
   an overlapping section which sets the first and second disks in an overlapped state in which the annular adhesive layer and the dotted adhesive layer are in contact with each other between the first and second disks.

22. The disk bonding system as claimed in claim 21 wherein the second adhesive supplying section comprises a nozzle system which forms the dot-shaped adhesive regions which are isolated from one another.

23. The disk bonding system as claimed in claim 22 wherein the nozzle system comprises at least one nozzle aimed upwards.

24. The disk bonding system as claimed in claim 21 wherein the second adhesive supplying section comprises a plurality of nozzles aimed vertically and arranged in a circle on an imaginary horizontal plane.

25. The disk bonding system as claimed in claim 21 wherein the first and second adhesive supplying sections are located at two separate positions, and the overlapping section comprises a disk transfer mechanism which transfers at least one of the first and second disks between the two separate positions.

26. The disk bonding system as claimed in claim 25 wherein the disk bonding system further comprises a spreading section which receives the first and second disks in the overlapped state from the overlapping section and spreads an adhesive layer between the first and second disks, and the disk transfer mechanism comprises a disk holding section which transfers the first and second disks in the overlapped state to the spreading section.

27. The disk bonding system as claimed in claim 25 wherein the disk transfer mechanism comprises a second disk gripping device which grips the second disk with the joint surface of the second disk facing downwards and a first disk gripping device which grips the first disk just below the second disk.

28. The disk bonding system as claimed in claim 25 wherein the overlapping section further comprises a stage which supports the first disk with the joint surface of the first disk facing upwards and the disk transfer mechanism comprises a disk holding section which holds the second disk with the joint surface of the second disk facing downwards just above the first disk, and the overlapping section moves the first disk supported by the stage and the second disk held by the disk holding section toward each other by moving at least one of the stage and the disk holding section vertically and thereby brings the first and second disks in the overlapped state.

29. The disk bonding system as claimed in claim 21 wherein the annular adhesive layer comprises a substantially circular outside periphery, each of the dot-shaped adhesive regions has a center, the centers of the dot-shaped adhesive regions are arranged in an imaginary circle which is greater in diameter than the circular outside periphery of the annular adhesive layer.

* * * * *